Yancy & Dorman,

Manf. Cheese.

No. 108,866.   Patented Nov. 1, 1870.

2 Sheets. Sheet 1.

Inventors.
E. G. Yancy,
C. E. Dorman

Witnesses.
J. H. Burridge
J. Holmes

Yancy & Dorman,
Manf. Cheese.
No. 108,866. Patented Nov. 1, 1870.

Inventors.
E. G. Yancy
C. E. Dorman

Witnesses.
J. H. Burridge
J. Holmes

United States Patent Office.

EDWIN LEE YANCY, OF BATAVIA, AND CHARLES EDWIN DORMAN, OF PEMBROKE, NEW YORK.

Letters Patent No. 108,866, dated November 1, 1870; antedated October 29, 1870.

IMPROVEMENT IN APPARATUS FOR MAKING CHEESE.

The Schedule referred to in these Letters Patent and making part of the same.

*To all whom it may concern:*

Be it known that I, EDWIN LEE YANCY, of Batavia, and CHARLES EDWIN DORMAN, of Pembroke, in the county of Genesee, and State of New York, have invented a certain new and improved Machine for Manufacturing Cheese; and we do hereby declare that the following is a full, clear, and complete description of the same, reference being had to the accompanying drawing making part of this specification, in which drawing—

Figure 1:
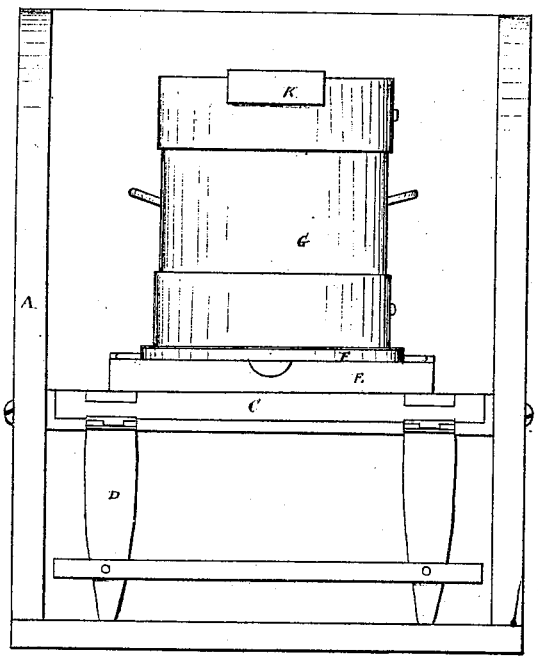
Figure 2:
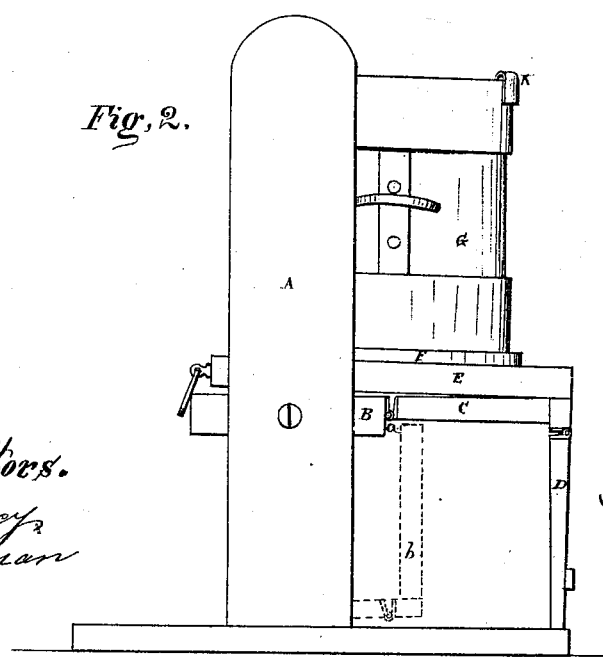
Figure 3:
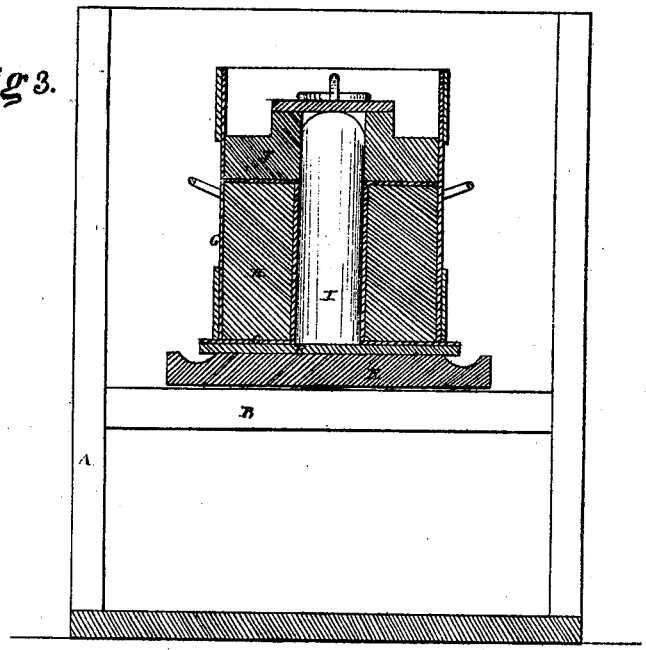
Figure 4:
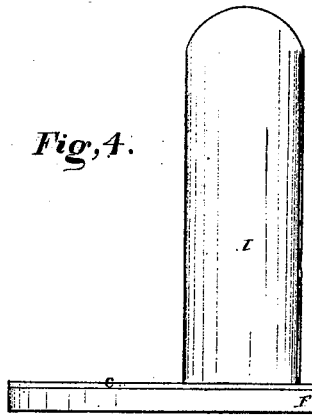
Figure 5:
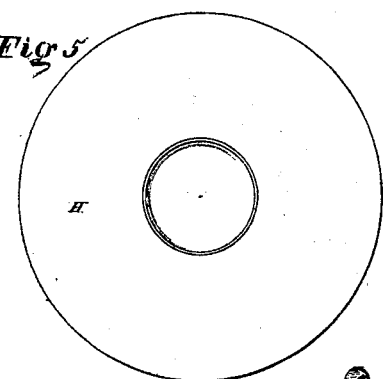
Figure 6:
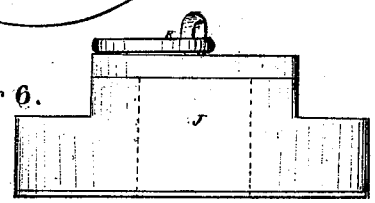

Figure 1 is a front view of the machine.
Figure 2, a side view.
Figure 3, a vertical transverse section.
Figures 4, 5, and 6, detached sections.

Like letters of reference refer to like parts in the several views.

Objective.

This invention has for its object the manufacturing of cheese in such way that said cheese shall have a central hole therein for the purpose of facilitating the curing of the cheese by drying it from the center, as well as from the circumference.

Descriptive.

In fig. 1, A represents a frame, which constitutes the press part of the apparatus.

B is a table or sill, on which the cheese for pressing is placed.

Attached to the front side of said table, by means of the hinges *a*, is a frame, C, supported at the front by the hinged legs D.

The purpose of said frame is to serve as an extension of the table B, on which the cheese and hoops stand previous to or subsequent to pressing.

The frame, when not required for immediate use, may be adjusted under the table out of the way, as indicated by the dotted line *b*, fig. 2.

E is the press-board, and

F, the cheese-board, on which the hoop G stands while containing the cheese H, fig. 3, a top view of which is shown in fig. 5.

It will be observed that from the center of the cheese-board extends a standard, I, fig. 4, the purpose of which will presently be shown.

J, fig. 3, is the follower, a detached view of which is shown in fig. 6.

It will be seen that the upper side of the cheese-board, and also the under side of the follower, are each covered with rubber cloth, *c*, whereby the curd or cheese is prevented from adhering to them when under pressure, thereby dispensing with the use of the ordinary cheese-cloths.

Operative.

The practical operation of this apparatus is as follows:

On placing the hoop, cheese, and press-boards on the table, as shown in figs. 1 and 2, a proper quantity of curd for a cheese is now thrown into the hoop around the standard referred to.

The follower J is placed upon the curd. The whole is now pushed back under the press, which is or may be of the ordinary kind, and the power applied in the ordinary way.

It will be obvious that on the removal of the cheese from the hoop there will be a hole formed through the center thereof by the standard, the purpose of which is, as abovesaid, to cause a more rapid curing of the cheese.

It not unfrequently happens that, in consequence of the great pressure expended upon the cheese while in the hoop, it becomes a matter of much labor and difficulty to remove the follower therefrom; and to do this a bar is frequently used, which is allowed to rest upon the edge of the hoop for a fulcrum, and thus used as a lever for lifting up the follower.

A lever used in this manner bruises the edges of the hoop.

To prevent this injury to the hoop an adjustable guard, K, figs. 1 and 2, is placed on the edge, and upon which the lever rests, thereby not only saving the edge of the hoop from being injured, but also adding to its strength, so that more power can be applied for removing the follower without injury to the hoop.

Claim.

What we claim as our invention, and desire to secure by Letters Patent, is—

The standard I, in combination with the cheese-board F, in the manner as described, and for the purpose specified.

E. L. YANCY.
C. E. DORMAN.

Witnesses:
S. COOPER,
GEO. G. STEGMANN.